US006474148B2

(12) United States Patent
Takagi et al.

(10) Patent No.: US 6,474,148 B2
(45) Date of Patent: Nov. 5, 2002

(54) DIAGNOSTIC APPARATUS FOR FUEL VAPOR PURGE SYSTEM

(75) Inventors: Naoya Takagi, Susono (JP); Mamoru Yoshioka, Susono (JP); Yoshihiko Hyoudou, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 09/782,052

(22) Filed: Feb. 14, 2001

(65) Prior Publication Data

US 2001/0027682 A1 Oct. 11, 2001

(30) Foreign Application Priority Data

Feb. 14, 2000 (JP) ....................................... 2000-035796
Sep. 14, 2000 (JP) ....................................... 2000-280218

(51) Int. Cl.[7] ............................................... G01M 15/00
(52) U.S. Cl. ....................................... 73/118.1; 73/49.7
(58) Field of Search ................................ 73/116, 117.2, 73/117.3, 118.1, 40, 46, 47, 49.7

(56) References Cited

U.S. PATENT DOCUMENTS 5,845,625 A 12/1998 Kidokoro et al. ........... 123/520
5,954,034 A * 9/1999 Takagi .................... 123/198 D
5,996,400 A * 12/1999 Nishioka et al. ......... 73/40.5 R
6,131,448 A * 10/2000 Hyodo et al. .............. 73/118.1
6,164,123 A * 12/2000 Corkill ....................... 123/518
6,176,118 B1 * 1/2001 Kidokoro et al. .............. 73/40
6,371,089 B1 * 4/2002 Matsuoka et al. .......... 123/519
6,382,017 B1 * 5/2002 Majkowski et al. ....... 73/118.1
6,405,718 B1 * 6/2002 Yoshioka et al. ....... 123/198 D

FOREIGN PATENT DOCUMENTS

| | | |
|---|---|---|
| JP | A-6-74104 | 3/1994 |
| JP | A-8-28367 | 1/1996 |
| JP | A-9-158794 | 6/1997 |

* cited by examiner

*Primary Examiner*—Eric S. McCall
(74) *Attorney, Agent, or Firm*—Kenyon & Kenyon

(57) ABSTRACT

A diagnostic apparatus for a fuel vapor purge system is provided which includes a pressure sensor that measures a pressure in a fuel tank, and which conducts leak diagnosis of a purge path based on a change in the pressure in the fuel tank and an amount of fuel vapor generated in the fuel tank. The change in the pressure is measured after sealing the purge path while providing a difference between inside pressure and outside pressure of the purge path, and the amount of fuel vapor is measured after applying an atmospheric pressure to the purge path and sealing the purge path. The diagnostic apparatus further detects a predetermined state after starting application of the atmospheric pressure to the purge path, and determines that the purge path has reached an atmospheric pressure state upon. detection of the predetermined state. The amount of fuel vapor generated in the fuel tank is measured when it is determined that the purge path has reached the atmospheric pressure state.

30 Claims, 10 Drawing Sheets

DIAGNOSTIC APPARATUS FOR FUEL VAPOR PURGE SYSTEM

INCORPORATION BY REFERENCE

The disclosures of Japanese Patent Applications No. 2000-035796 filed on Feb. 14, 2000 and No. 2000-280218 filed on Sep. 14, 2000 each including the specification, drawing and abstract are incorporated herein by reference in its entirety.

BACKGROUND OF THE INVENTION

1. Field of the Invention

The invention relates to a diagnostic apparatus for a fuel vapor purge system for use in an internal combustion engine installed in a motor vehicle such as an automobile.

2. Discussion of Related Art

In a conventional fuel vapor purge system installed in a vehicle, fuel vapor generated in a fuel tank is introduced through a fuel vapor conduit into a canister and trapped therein, and the fuel vapor thus trapped is then discharged (purged) when appropriate from the canister into an intake passage through a purge passage while the ambient air is being introduced into the canister.

Apparatuses for diagnosing a failure in the fuel vapor purge system, i.e., those for detecting leakage due to a hole(s) formed in a purge path, are also well known in the art. The purge path may include the fuel tank, fuel vapor conduit, canister, and purge passage. In many of the apparatuses, a negative pressure in the intake passage produced during operation of the internal combustion engine is introduced into the purge path through the purge passage, and then the purge path is temporarily sealed. In this condition, subsequent changes in the pressure within the purge path are measured by a pressure sensor. If the rate of increase of the pressure is higher than a predetermined value, the fuel vapor purge system is diagnosed as being at fault.

In order to accurately determine a failure in the fuel vapor purge system, the amount of fuel vapor generated in the fuel tank must be within a predetermined range. This is because the failure diagnosis of the fuel vapor purge system is conducted by sealing the purge path in the negative pressure state and detecting changes in the pressure in the purge path with time. Namely, if the amount of fuel vapor generated in the fuel tank is not within the predetermined range, it cannot be determined whether the pressure within the purge path has been raised by the ambient air introduced into the purge path through a hole(s) or crack(s) formed therein, or by a large amount of fuel vapor generated in the fuel tank.

In view of the above problem, a diagnostic apparatus as disclosed in Japanese Laid-open Patent Publication No. HEI 6-74104 is adapted to first detect leakage by introducing a negative pressure into a purge path, seal the purge path after introducing the atmospheric pressure into the path, and then measure the amount of fuel vapor generated in the fuel tank by means of the pressure sensor. The apparatus then corrects the result of leakage detection based on the result of measurement of the fuel vapor amount.

The outputs of the pressure sensor used in the above-described fuel vapor purge system involve errors caused by manufacturing variations, and the use of pressure sensors having output errors within a predetermined range of −0.133 kPa (=−1 mmHg)) to +0.133 kPa (=+1 mmHg)) in the atmospheric pressure state is allowed. In the diagnostic apparatus as described above, since the purge path that has been held in the negative pressure state is brought into the atmospheric pressure state, the minimum value of the above-mentioned output error range is determined as representing the atmospheric pressure state. In other words, when the output of the pressure sensor reaches −0.133 kPa from the negative pressure side, it is determined that the purge path is in the atmospheric pressure state. The reason for this is as follows: in the case where the apparatus is designed to determine the atmospheric pressure state when the output of the pressure sensor is 0 kPa, and where the purge path suffers from leakage and almost no fuel vapor is generated in the fuel tank, the output of a pressure sensor that outputs the minimum value of the output error range is maintained at −0.133 kPa. In this state, the diagnostic apparatus determines that the purge path has not yet reached the atmospheric pressure, and is thus inhibited from measuring the amount of fuel vapor generated.

For a pressure sensor that outputs the maximum value of the output error range, on the contrary, the minimum value of the output error range represents the state in which the internal pressure of the purge path is in the course of increasing toward the atmospheric pressure. If the purge path is sealed when the output is equal to the minimum value and the fuel vapor amount is measured, therefore, the measurement accuracy of the fuel vapor amount may deteriorate, resulting in a reduced accuracy in the leak diagnosis of the purge path.

SUMMARY OF THE INVENTION

It is therefore an object of the invention to provide a diagnostic apparatus for a fuel vapor purge system, which is capable of measuring fuel vapor generated in a fuel tank with improved accuracy, irrespective of variations in the output error, thus assuring an improved accuracy in the leak diagnosis.

To accomplish the above and other objects, the invention provides a diagnostic apparatus for a fuel vapor purge system wherein fuel vapor generated in a fuel tank is trapped in a canister, and the fuel vapor trapped in the canister is purged into an intake passage of an internal combustion engine through a purge path including the fuel tank, which system comprises (1) a pressure sensor that measures a pressure of a space in the fuel tank, (2) a diagnosing unit that conducts leak diagnosis of the purge path based on a change in the pressure in the fuel tank and an amount of fuel vapor generated in the fuel tank, the change in the pressure being measured after sealing the purge path while providing a difference between inside pressure and outside pressure of the purge path, the amount of fuel vapor being measured after applying an atmospheric pressure to the purge path and sealing the purge path, and (3) a determining unit that determines that the purge path has reached an atmospheric pressure state upon detection of a predetermined state after starting application of the atmospheric pressure to the purge path. In this system, the diagnosing unit measures the amount of fuel vapor generated in the fuel tank when the determining unit determines that the purge path has reached the atmospheric pressure state.

In diagnosing a failure in the fuel vapor purge system, the purge path is brought into the atmospheric pressure state so that the amount of fuel vapor generated in the fuel tank can be measured. The diagnostic apparatus according to the invention sets in advance a particular state in which introduction of the atmospheric pressure is completed, and determines that the purge path has reached the atmospheric pressure state when the above particular state is detected. Thus, the diagnostic apparatus of the invention is able to determine the atmospheric pressure state of the purge path with high accuracy, irrespective of variations in output errors among individual pressure sensors, thus assuring improved accuracy in the leak diagnosis.

DETAILED DESCRIPTION OF PREFERRED EMBODIMENTS

First Embodiment

Hereinafter, the first embodiment of a diagnostic apparatus for a fuel vapor purge system according to the invention will be described with reference to FIGS. 1 to 4.

Figure 1:
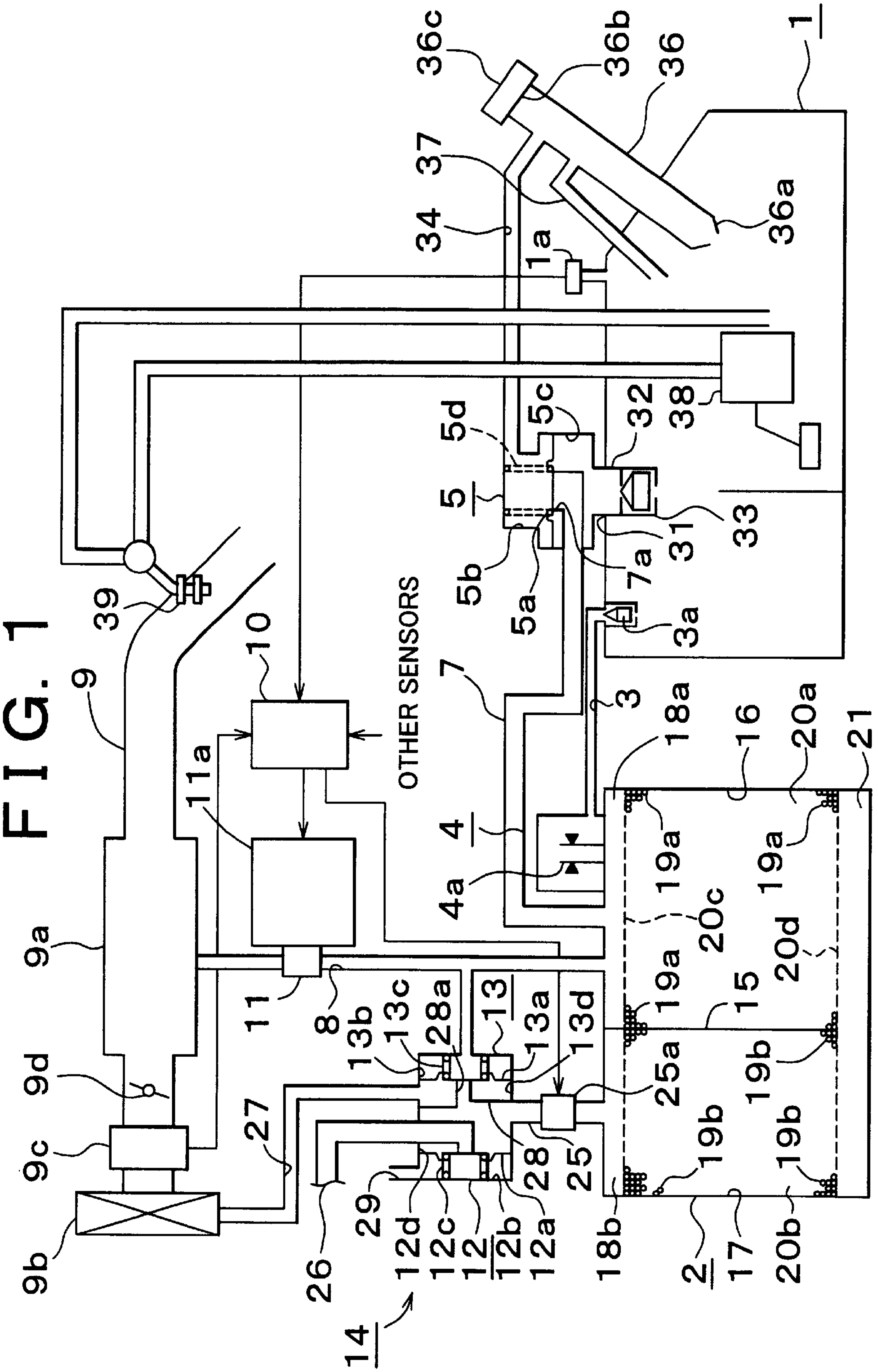
FIG. 1 is a schematic diagram illustrating a fuel vapor purge system including a diagnostic apparatus of the first embodiment of the invention.

FIG. 1 is a schematic diagram illustrating the whole fuel vapor purge system according to the first embodiment of the invention. The fuel vapor purge system is mounted for use with, i.e., a gasoline engine installed in a motor vehicle.

A fuel vapor conduit 3 for guiding the fuel vapor generated in a fuel tank 1 of the gasoline engine into a canister 2 is open and connected at its one end to the fuel tank 1 via a float 3*a*. The other end of the fuel vapor conduit 3 is connected to the canister 2 via a pressure buffer chamber 4 disposed on top of the canister 2. An orifice 4*a* is provided within the pressure buffer chamber 4. The orifice 4*a* permits the fuel tank 1 and the canister 2 to always communicate with each other so as to make the pressure within the fuel tank 1 equal to the internal pressure of the canister 2.

The fuel tank 1 is also provided with a differential pressure valve 5 adapted to be open during refueling. The differential pressure valve 5 is connected to the canister 2 through a breather passage 7. Accordingly, when the differential pressure valve 5 is open during refueling, fuel vapor within the fuel tank 1 is introduced into the canister 2 through the breather passage 7.

The canister 2 communicates, through a purge passage 8, with a surge tank 9*a* that forms a part of an engine intake passage 9. The purge passage 8 is provided with a purge control valve 11. The purge control valve 11 is driven to a selected one of open and closed positions by a drive circuit 11*a*, in response to a control signal from an ECU (Electronic Control Unit) 10 in the form of a microcomputer.

The purge control valve 11 may operate under purge control to adjust the amount of fuel supplied by purging from the canister 2 to the engine intake passage 9. In failure diagnosis control, the purge control valve 11 may shut off and open the purge passage 8. For example, a vacuum switching valve (VSV), or the like, is used as the purge control valve 11.

The interior of the canister 2 is divided into two chambers by a vertically extending partition plate 15: a main chamber 16 located under the pressure buffer chamber 4, and a sub chamber 17 located under an ambient-air-side control valve 14 and having a smaller volume than the main chamber 16. Air layers 18*a* and 18*b* are respectively formed in the upper portions of the main chamber 16 and sub chamber 17, and adsorbent layers 20*a* and 20*b* filled with activated charcoal adsorbents 19*a* and 19*b* are respectively formed under the air layers 18*a* and 18*b* .

Filters 20*c* and 20*d* are provided on top and bottom of the adsorbent layers 20*a* and 20*b*, respectively, and the activated charcoal adsorbents 19*a* and 19*b* fill the space between the filters 20*c* and 20*d*. The space located under the filter 20*d* provides a diffusion chamber 21, which allows the main chamber 16 and sub chamber 17 to communicate with each other.

The breather passage 7 is connected at one end thereof to the upper surface of the canister 2 at the top of the main chamber 16. The purge passage 8 is similarly connected to the main chamber 16 on the left side of the opening position of the breather passage 7 as viewed in FIG. 1.

While the purge control valve 11 is held in an open position, and a pressure lower than the atmospheric pressure is being introduced into the canister 2, the space within the purge passage 8 sequentially communicates with the main chamber 16, pressure buffer chamber 4, fuel vapor conduit 3 and the fuel tank 1 in this order. The space within the breather passage 7 also communicates with the main chamber 16, which means that the breather passage 7 shares the same space with the purge passage 8. In this specification, pressure lower than the atmospheric pressure will be referred to as egative pressure and pressure higher than the atmospheric pressure will be referred to as ositive pressure Thus, the shared spaces within the fuel vapor purge system, which communicate with each other with a negative pressure being applied to the canister 2, form a purge path. The diagnostic apparatus for the fuel vapor purge system according to the present embodiment determines the presence/absence of a failure in the fuel vapor purge system by determining the presence/absence of leakage in the purge path.

A ventilation port 25 is also formed in the top surface of the canister 2 located above the sub chamber 17. The ambient-air-side control valve 14 is provided so as to communicate with the ventilation port 25. A pressure block valve 25*a* is disposed in the middle portion of the ventilation port 25. The pressure block valve 25*a* is normally open, but is controlled by the ECU 10 to be opened and closed in a diagnosing process in the manner as described below. For example, a VSV (vacuum switching valve) is used as the pressure block valve 25*a*.

The ambient-air-side control valve 14 includes a release control valve 12 and an ambient-air introduction control valve 13 which are located laterally opposite to each other as viewed in FIG. 1. An atmospheric pressure chamber 12*b* is formed on the left side of a diaphragm 12*a* provided in the release control valve 12 as viewed in FIG. 1, and a negative pressure chamber 13*b* is formed on the right side of a diaphragm 13*a* provided in the ambient-air introduction control valve 13 as viewed in FIG. 1. The space interposed between these two diaphragms 12*a* and 13*a* is divided into two pressure chambers by a partition wall 28. One of the two pressure chambers is a positive pressure chamber 12*d* of the release control valve 12, and the other is an atmospheric pressure chamber 13*d* of the ambient-air introduction control valve 13. The negative pressure chamber 13*b* communicates with the purge passage 8, and a pressure generated in the purge passage 8 is introduced into the negative pressure chamber 13*b*.

A pressure port 28*a* is formed in a part of the partition wall 28, and the opening at the distal end of the pressure port 28*a* is allowed to be closed by the diaphragm 13*a*. An ambient air conduit 27 communicates with the atmospheric pressure chamber 13*d*. The diaphragm 13*a* is pressed against the opening at the distal end of the pressure port 28*a* due to the biasing force of a spring 13*c* provided in the negative pressure chamber 13*b*, so that the ambient-air introduction control valve 13 is normally rendered in the closed state.

A release port 29 leading to the atmospheric pressure chamber 12*b* of the release control valve 12 is formed in the upper portion of the ambient-air-side control valve 14, such that the interior of the atmospheric pressure chamber 12*b* is always held at the atmospheric pressure. The ambient-air-side control valve 14 is also provided with a discharge port 26 for guiding gas whose fuel components have been trapped in the canister 2, to the outside of the vehicle (i.e., to the atmosphere). In an ORVR (Onboard Refueling Vapor Recovery) process, a large amount of the air (gas whose fuel components have been removed) is to be released or discharged to the outside through the discharge port 26. To this end, the discharge port 26 has substantially the same cross-sectional area as the breather passage 7. The opening formed at one end of the discharge port 26 remote from the outside is adapted to be closed by the diaphragm 12*a* of the release control valve 12. The diaphragm 12*a* is pressed against the opening of the discharge port 26 due to the biasing force of a spring 12*c* provided in the atmospheric pressure chamber 12*b*. Accordingly, the release control valve 12 is held in the closed state until the internal pressure of the canister 2 reaches a predetermined level or higher.

If a pressure higher than that in the canister 2 is applied from the breather passage 7 into the canister 2 during refueling, the pressure in the positive pressure chamber 12*d* of the release control valve 12 is increased. When the difference between the pressure in the positive pressure chamber 12*d* and the atmospheric pressure introduced from the release port 29 into the atmospheric pressure chamber 12*b* reaches a predetermined level, the release control valve 12 is opened. As a result, gas, having passed through with the main chamber 16 and sub chamber 17 in which fuel vapor was adsorbed and removed, is discharged into the outside through the ventilation port 25 and the discharge port 26.

An insertion hole 31 is formed through the top wall of the fuel tank 1. A cylindrical breather pipe 32 forming a part of the breather passage 7 is inserted into the insertion hole 31 and fixed in position. A float valve 33 is formed at the bottom of the breather pipe 32. The differential pressure valve 5 is provided above the fuel tank 1 so as to cover an opening 32*a* at the upper end of the breather pipe 32. The interior of the differential pressure valve 5 is divided by a diaphragm 5*a* into a first pressure chamber 5*b* disposed above the diaphragm 5*a*, and a second pressure chamber 5*c* disposed below the diaphragm 5*a*. Under the biasing force of a spring 5*d* provided in the first pressure chamber 5*b*, the diaphragm 5*a* is pressed against an opening 7*a* at the upper end of the breather passage 7 entering the second pressure chamber 5*c*. Thus, the opening 7*a* at the upper end of the breather passage 7 is adapted to be closed by the diaphragm 5*a* .

The first pressure chamber 5*b* of the differential pressure valve 5 communicates via a pressure passage 34 with the upper portion of a fuel fill pipe 36 provided in the fuel tank 1. A restriction 36*a* is formed at the lower end of the fuel fill pipe 36. When the supplied fuel passes through the restriction 36*a*, the flow direction of fuel vapor within the fuel fill pipe 36 is restricted to the direction from a filler opening 36*b* toward the fuel tank 1. Accordingly, fuel vapor can be prevented from leaking from the filler opening 36*b* to the outside of the vehicle. A circulation pipe 37 is provided which permits the respective upper portions of the fuel tank 1 and fuel fill pipe 36 to communicate with each other. Thus, fuel vapor within the fuel tank 1 is circulated between the fuel tank 1 and fuel fill pipe 36 during refueling, thereby enabling smooth fuel supply.

A pressure sensor 1*a* for detecting the pressure in the fuel tank 1 is also provided in the upper portion of the fuel tank 1. In the present embodiment, a sensor that detects a pressure relative to the atmospheric pressure is used as the pressure sensor 1*a*. Here, outputs of the pressure sensor 1*a* involve errors caused by manufacturing variations, and output errors within a predetermined range of −PA (=−0.133 kPa (=−1 mmHg)) to +PB (=+0.133 kPa (=+1 mmHg)) in the atmospheric pressure state are allowed. A detection signal of the pressure sensor 1*a* is output to the ECU 10 that performs purge control and diagnosis control as described later. The ECU 10 also receives signals from various sensors, such as an airflow meter 9*c* provided in the engine intake passage 9.

The fuel vapor purge system constructed as described above functions as follows. When the internal pressure of the fuel tank 1 is increased to a prescribed pressure level or higher through evaporation of fuel within the fuel tank 1, a flow of fuel vapors in the direction from the fuel tank 1 toward the canister 2 is formed within the fuel vapor conduit 3. Thus, the fuel vapor in the fuel tank 1 is introduced into the canister 2 through the orifice 4*a* of the pressure buffer chamber 4. Since the first and second pressure chambers 5*b* and 5*c* of the differential pressure valve 5 have the same internal pressure, the differential pressure valve 5 is held in the closed position, and thus the breather passage 7 is closed.

When the fuel vapor reaches the canister 2 after passing through the fuel vapor conduit 3, its fuel components are first trapped by the activated charcoal adsorbent 19*a* filling the adsorbent layer 20*a* of the main chamber 16. The fuel vapor then passes through the adsorbent layer 20*a* and reaches the diffusion chamber 21. The fuel vapor further travels through the diffusion chamber 21 into the sub chamber 17 where the fuel components that could not be trapped by the adsorbent layer 20*a* of the main chamber 16 are trapped in the adsorbent layer 20*b*. Thus, the fuel vapor flows along the U-shaped traveling path within the canister 2, so that the fuel vapor is brought into contact with the activated charcoal adsorbents 19*a* and 19*b* of the adsorbent layers 20*a* and 20*b* for an extended period of time. Consequently, the fuel components are effectively trapped.

The resultant gas with most of the fuel components trapped by the activated charcoal adsorbents 19*a* and 19*b* of the adsorbent layers 20*a* and 20*b* opens the release control valve 12, and is discharged to the outside through the discharge port 26. At this time, the negative pressure chamber 13*b* of the ambient-air introduction control valve 13 has a positive internal pressure that is higher than the internal pressure of the atmospheric pressure chamber 13*d*, and therefore the ambient-air introduction control valve 13 does not open. Accordingly, fuel vapor does not leak to the outside of the vehicle through the ambient-air introduction control valve 13 and the ambient-air conduit 27.

Next, the fuel components trapped in the canister 2 are supplied to the engine intake passage 9 in the following manner. When the engine is started, a negative pressure arises in the vicinity of an opening of the purge passage 8 that faces the surge tank 9*a*. Then, a flow or stream of fuel vapors in the direction from the canister 2 toward the surge tank 9*a* is developed within the purge passage 8 every time the purge control valve 11 is driven to an open position in response to a control signal from the ECU 10.

Accordingly, the interior of the canister 2 is rendered at a negative pressure, so that the ambient-air introduction control valve 13 is opened, while at the same time the air is introduced from the ambient-air conduit 27 into the sub chamber 17 of the canister 2. As a result, the air thus introduced causes the fuel components adsorbed by the activated charcoal adsorbents 19*a* and 19*b* to be separated therefrom, and absorbs the fuel components thus separated.

The air thus introduced guides the fuel vapor into the purge passage 8 and discharges it into the surge tank 9*a* through the purge control valve 11. In the surge tank 9*a*, the fuel vapor is mixed with the intake air that has passed through an air cleaner 9*b*, airflow meter 9*c* and throttle valve 9*d*, and supplied into cylinders (not shown). The fuel vapor thus mixed with the intake air is burned in each cylinder, together with fuel delivered from the fuel tank 1 through a fuel pump 38 and emitted from a fuel injection valve 39.

Where the fuel tank 1 is cooled while the engine is kept stopped during long parking of the vehicle, for example, substantially no fuel vapor is generated in the fuel tank 1, and the pressure in the fuel tank 1 becomes relatively lower than that in the canister 2. In this case, the pressure buffer chamber 4 is rendered at a negative pressure, and fuel vapor in the canister 2 is returned to the fuel tank 1 through the orifice 4*a* and fuel vapor conduit 3.

The diagnostic process performed by the ECU 10 for diagnosing a failure in the fuel vapor purge system conducted will now be described.

The diagnostic process is roughly divided into the following processes: measurement of the amount of change in the internal pressure (hereinafter, referred to as ressure change amount ΔP1 based on the amount of fuel vapor generated in the fuel tank 1; application of a negative pressure to the purge path and sealing thereof; measurement of the rate of change in the internal pressure of the fuel tank 1 (hereinafter, referred to as ressure change rate ΔP15 after sealing; and leak diagnosis based on the pressure change amount ΔP1 and the pressure change rate ΔP15. In the following description, the respective processes and the operation of opening and closing the pressure block valve 25*a* during execution of the processes will be briefly descried with reference to the timing chart of FIG. 2.

Measurement of Pressure Change Amount ΔP1

The pressure change amount DP1 indicates the amount of vapor generated in the fuel tank 1. The measurement of DP1 is conducted before the start of the purge control. In addition, the measurement is conducted after the start of the purge control under a condition that a predetermined time period (e.g., min. has passed since the previous measurement in carrying out the above-mentioned diagnostic process.

Where the measurement is conducted before the start of the purge control, the pressure block valve 25*a* is forced to be closed when the purge path is brought into the atmospheric pressure state (timing t1). Where the measurement is conducted after the start of the purge control, the purge control valve 11 in addition to the pressure block valve 25*a* are forced to be closed when the purge path is brought into the atmospheric pressure state (timing t7). While the purge path is kept sealed in this manner, the amount of change in the internal pressure of the fuel tank 1 during a predetermined time period (e.g., 5 sec. is measured as the pressure change amount ΔP1.

Figure 3:
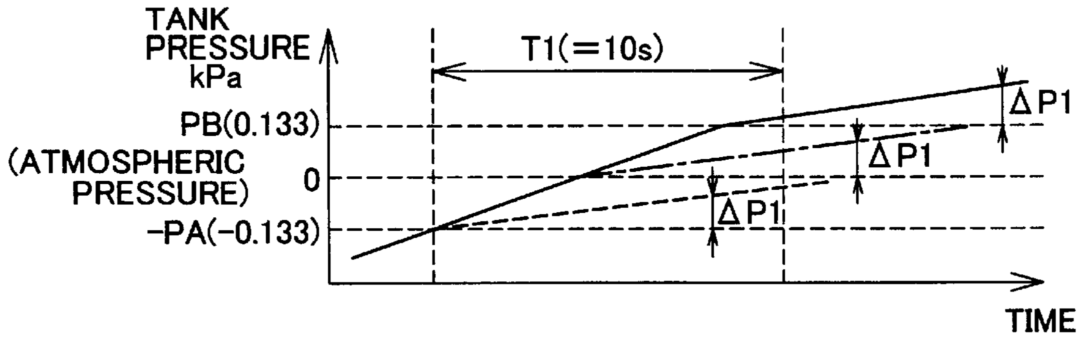
FIG. 3 is a view useful in explaining output errors of a pressure sensor.
Figure 4:
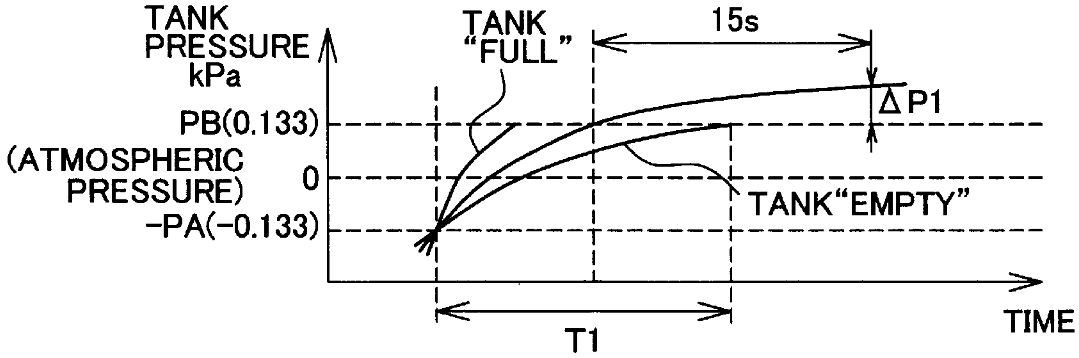
FIG. 4 is a graph showing the relationship between an increase in the tank pressure due to fuel vapor generated in a fuel tank, and an increase in the tank pressure due to introduction of the ambient air.

In the diagnostic process of the present embodiment, the atmospheric pressure state as a basis for the measurement of the pressure change amount ΔP1 is determined when a predetermined period of time T1 (10 seconds in the present embodiment) has passed since a predetermined pressure −PA (=−0.133 kPa) was measured by the pressure sensor 1*a*, as shown in FIGS. 3 and 4. Outputs of the pressure sensor 1*a* involve errors caused by manufacturing variations, and a certain range of −PA (=−0.133 kpa) to +PB (=+0.133 kPa) in the atmospheric pressure state is considered as an allowable range of the output errors. In this embodiment, the purge path is brought from the negative pressure state into the atmospheric pressure state. The predetermined period of time T1 is provided because, even if the remaining fuel amount is zero (the fuel tank is empty), the pressure within the fuel tank (which will be simply called ank pressure reaches the atmospheric pressure without fail within the predetermined time period T1 after the minimum value −PA was measured by a particular pressure sensor la that outputs the maximum value PB when the tank pressure is equal to the atmospheric pressure. Therefore, even if the pressure sensor 1*a* that outputs the maximum value PB in the atmospheric pressure state is used, the amount of fuel vapor generated can be measured with improved accuracy. The predetermined time period T1 may be calculated based on the internal pressure of the purge path at the time when the pressure block valve 25*a* is opened, the diameter of the orifice 4*a*, and the volume of the space in the fuel tank 1 when the remaining fuel amount is zero (the fuel tank is empty). In the case of a particular pressure sensor 1*a* that outputs the minimum value −PA when the tank pressure is equal to the atmospheric pressure, the tank pressure has surely reached the atmospheric pressure at a point of time when the minimum value −PA was measured. Thus, the amount of fuel vapor generated in the fuel tank can be measured with high reliability.

Application of Negative Pressure to Purge Path and Sealing of Purge Path

Upon application of a negative pressure to the purge path, it is first determined whether certain preconditions for the failure diagnosis have been established or not. The preconditions may include: leak diagnosis of the purge path has not been completed; purge control is being performed; the altitude is equal to or lower than a predetermined value (e.g., 2,400 m), i.e., the ambient air pressure is equal to or higher than a predetermined value; the cooling water temperature is within a predetermined range (e.g., −10° C. to 35° C.) upon starting of the engine; the vehicle is not running uphill or downhill; and other conditions. If all of these conditions are satisfied, it is determined that the preconditions for the failure diagnosis are established.

Figure 2:
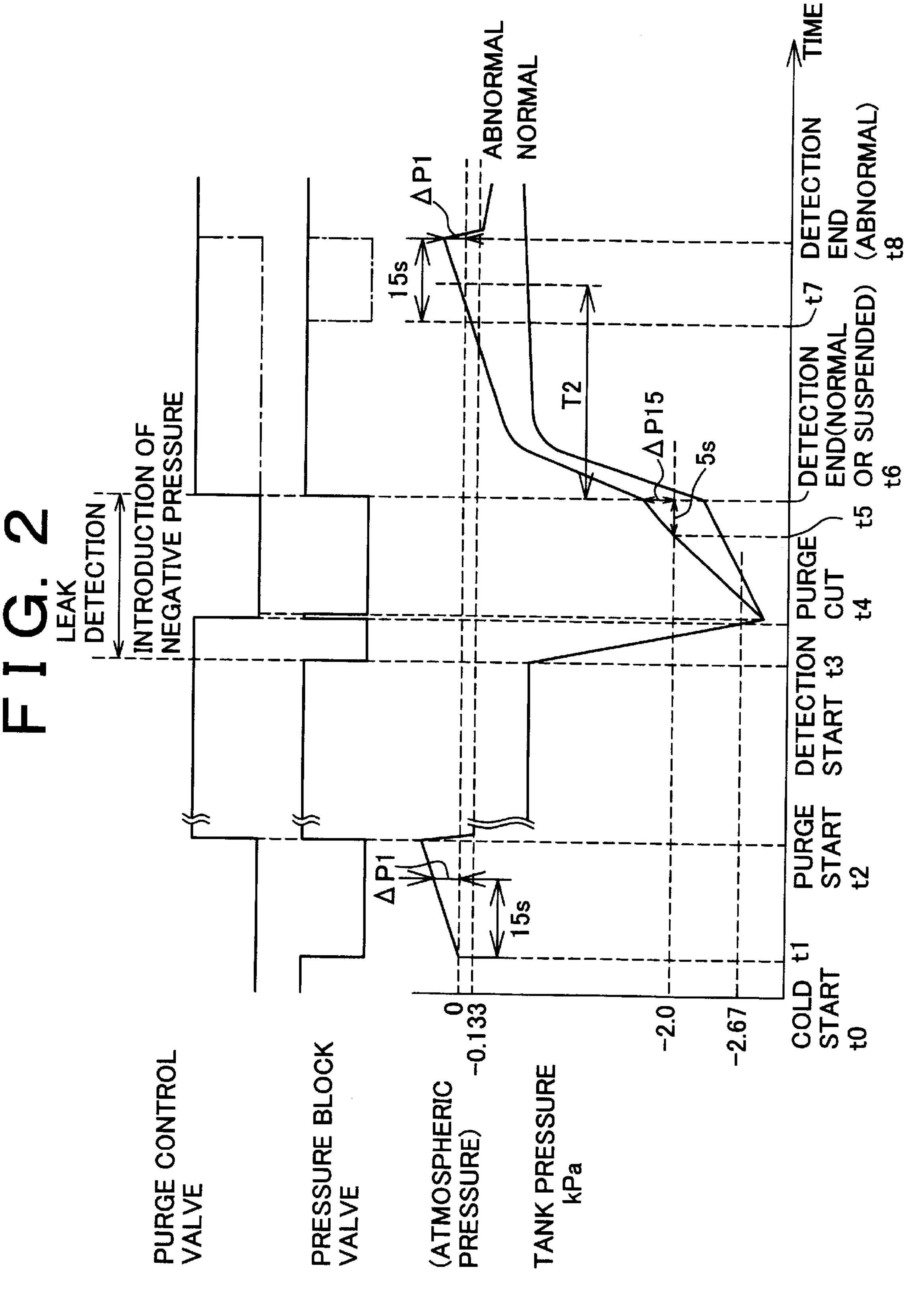
FIG. 2 is a timing chart showing one example of control operations performed by the diagnostic apparatus of the first embodiment.

If the preconditions are established, the pressure block valve 25*a* is closed (timing t3 in FIG. 2). As a result, a negative pressure in the surge tank 9*a* is applied to the purge path through the purge passage 8, whereby the internal pressure of the fuel tank 1, in other words, the internal pressure of the purge path, is gradually reduced. If the internal pressure of the fuel tank 1 then reaches a predetermined value (e.g., 2.67 kPa=20 mmHg , the purge control valve 11 is closed (timing t4). As a result, application of a negative pressure to the purge path is discontinued, and at the same time the purge path is sealed.

When the negative pressure is applied to the purge path as described above, the internal pressure of the fuel tank 1 tends to be reduced with a delay as compared with the internal pressure of the canister 2. Therefore, even if the purge path is sealed, the internal pressure of the fuel tank 1 is further reduced because of a difference between the internal pressure of the fuel tank 1 and that of the canister 2. If the internal pressure of the fuel tank 1 changes by a great degree after the purge path was sealed, due to the imbalance in the internal pressure between the canister 2 and fuel tank 1, this change may adversely affect subsequent measurement of the pressure change rate ΔP15.

In the present embodiment, therefore, the pressure block valve 25*a* is temporarily opened only for a predetermine period after the internal pressure of the fuel tank 1 reaches the predetermined value as described above, in order to forcibly raise the internal pressure of the canister 2. By quickly correcting the imbalance in the internal pressure between the canister 2 and the fuel tank 1, the above-described change in the internal pressure of the fuel tank 1 resulting from the imbalance is suppressed as much as possible.

Measurement of Pressure Change Rate ΔP15

After a negative pressure is applied to the purge path and the purge path is sealed as described above, the pressure change rate ΔP15 is measured. For example, in this measurement, the amount of a pressure change during a predetermined time period (e.g., sec. (timing t5 to t6) is measured as the pressure change rate ΔP15. The predetermined time period starts when the internal pressure of the fuel tank 1 reaches a predetermined value (e.g., 2.0 kPa=15 mmHg (timing t5) that is higher than a pressure value at a point of time when the application of a negative pressure is finished. After the measurement of the pressure change rate ΔP15 is finished (timing t6), the pressure block valve 25*a* is again held in the open position.

Leak Diagnosis based on Pressure Change Amount ΔP1 and Pressure Change Rate ΔP15

To determine the presence of a failure in the fuel vapor purge system, the pressure change rate ΔP15 is first compared with a predetermined normal-state is determination value. If the pressure change rate ΔP15 is smaller than the normal-state determination value, it can be determined that no leakage through a hole or holes occurs in the purge path. As a result, the system is diagnosed as being in a normal state.

If the pressure change rate ΔP15 is equal to or larger than the normal-state determination value, the pressure change rate ΔP15 is then compared with an abnormal-state determination value that is set to be larger than the normal-state determination value. If the pressure change rate ΔP15 is equal to or larger than the abnormal-state determination value, the pressure change amount ΔP1 is compared with a predetermined value (e.g., 0.267 kPa=mmHg. If the pressure change amount ΔP1 is equal to or smaller than the predetermined value, i.e., if the internal pressure of the fuel tank 1 has increased only by a small degree due to fuel vapor generated therein, it can be determined that the increase in the pressure change rate ΔP15 to the abnormal-state determination value or higher is caused by leakage of the purge path. In this case, the system is diagnosed as being in an abnormal state.

If the pressure change rate ΔP15 is equal to or greater than the abnormal-state determination value, but the pressure change amount ΔP1 is larger than the predetermined value, or if the pressure change rate ΔP15 is less than the abnormal-state determination value, it is difficult to accomplish highly accurate leak diagnosis, and therefore diagnosis or determination on the normal/abnormal state of the system is suspended.

A control routine for measuring the pressure change amount ΔP1 will now be described with reference to the flowchart shown in FIG. 5.

Figure 5:
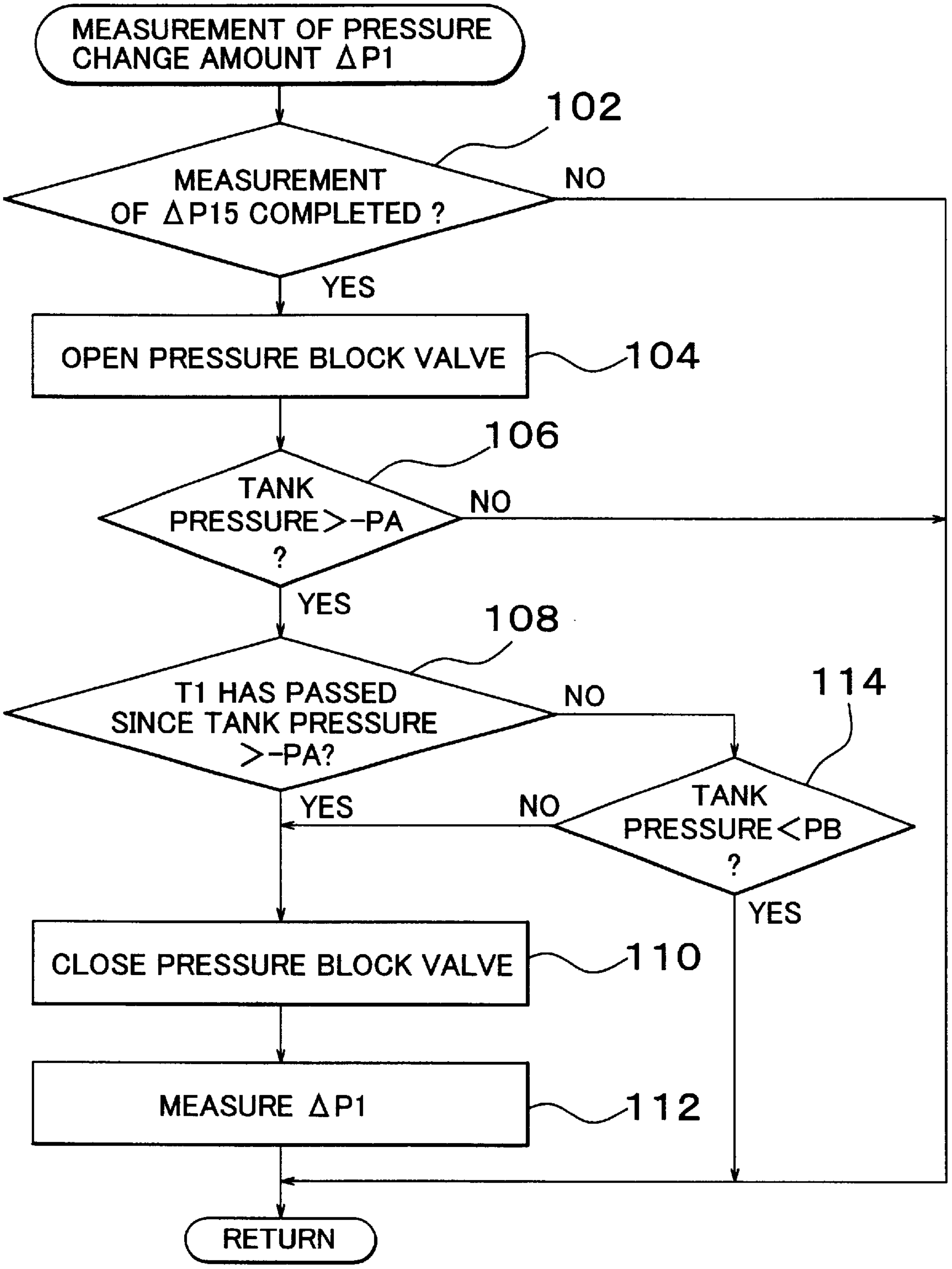
FIG. 5 is a flowchart showing a control routine of a measurement process according to the first embodiment of the invention.

A series of operations as indicated in the flowchart of FIG. 5 is performed by the ECU 10 as an interrupt routine to be executed at predetermined time intervals.

The ECU 10 initially executes step 102 to determine whether measurement of the pressure change rate ΔP15 has been completed or not. If it is determined that measurement of the pressure change rate ΔP15 has not been completed, the ECU 10 temporarily terminates the control routine.

If it is determined that measurement of the pressure change rate ΔP15 has been completed, the ECU 10 executes step 104 to open the pressure block valve 25*a* so as to introduce the atmospheric pressure into the purge path.

Then, in step 106, the ECU 10 determines whether the tank pressure is higher than −PA (=−0.133 kPa) or not. If step 106 determines that the tank pressure is equal to or lower than −PA, the ECU 10 temporarily terminates the control routine. If step 106 determines that the tank pressure is higher than −PA, the ECU 10 proceeds to step 108.

In step 108, the ECU 10 determines whether the predetermined time period T1 has passed or not since the tank pressure exceeded −PA. If step 108 determines that the predetermined time period T1 has not passed since the tank pressure exceeded −PA, the control flow goes to step 114. If it is determined that the predetermined time period T1 has passed since the tank pressure exceeded −PA, the control flow goes to step 110.

In step 114, the ECU 10 determines whether the tank pressure is lower than PB or not. If step 114 determines that the tank pressure is lower than PB, the ECU 10 temporarily terminates the control routine. If it is determined that the tank pressure is equal to or higher than PB, the ECU 10 proceeds to step 110.

In step 110, the ECU 10 operates to close the pressure block valve 25*a*, assuming that the tank pressure is certainly equal to or higher than the atmospheric pressure.

Then, in step 112, the ECU 10 measures the pressure change amount ΔP1 in 15 seconds after the pressure block valve 25*a* was closed. The ECU 10 performs leak diagnosis of the purge path based on this pressure change amount ΔP1 and pressure change rate ΔP15.

The present embodiment of the invention as described above yields the following effects or advantages.

(1) In the diagnostic apparatus of the present embodiment, the atmospheric pressure state as the basis for the measurement of the pressure change amount ΔP1 is determined at a set point of time when the predetermined time period T1 (10 seconds in the present embodiment) has passed since the predetermined pressure −PA (=−0.133 kPa) was measured by the pressure sensor 1*a*. Accordingly, the tank pressure reaches the atmospheric pressure without fail in the predetermined time period T1 after the minimum value −PA was measured by the pressure sensor 1*a* that outputs the maximum value PB when the actual tank pressure is equal to the atmospheric pressure. Thus, the amount of fuel vapor generated in the fuel tank is measured with improved accuracy, thus assuring improved accuracy in the leak diagnosis. Moreover, in the case of the pressure sensor la that outputs the minimum value −PA when the actual tank pressure is equal to the atmospheric pressure, the tank pressure surely reaches the atmospheric pressure at a point of time when the minimum value −PA is measured. Thus, the amount of fuel vapor generated in the fuel tank is measured with improved accuracy, thus assuring improved accuracy in leak diagnosis.

(2) In the present embodiment, as shown in FIG. 4, if the tank pressure becomes equal to or higher than PB within the predetermined time period T1 after the predetermined pressure −PA (=−0.133 kPa) was measured by the pressure sensor 1*a*, it is determined that the tank pressure has reached the atmospheric pressure. Therefore, even the pressure sensor la that outputs the measurement value PB in the atmospheric pressure state can reliably measure the atmospheric pressure state. As a result, the measurement accuracy of the fuel vapor generation amount can be improved, and thus the leak diagnosis accuracy can be improved.

Second Embodiment

Hereinafter, the second embodiment of the invention will be described mainly regarding differences from the first embodiment. Since a diagnostic apparatus according to the second embodiment is supposed to have the same structure as that of the first embodiment, the structure of the second embodiment will not be described herein.

In the first embodiment, the purge path is determined to be in the atmospheric pressure state when the predetermined time period T1 has passed since the tank pressure measured by the pressure sensor 1*a* exceeded −PA after the atmospheric pressure was introduced into the purge path. In the present embodiment, on the other hand, the purge path is determined to be in the atmospheric pressure state when a second predetermined period of time T2 (as shown in FIG. 2) has passed since the introduction of the ambient air was started (since the pressure block valve 25*a* was opened) after detection of the pressure change rate ΔP15. The second predetermined time period T2 can also be calculated based on the internal pressure of the purge path at the time when the pressure block valve 25*a* is opened, the diameter of the orifice 4*a*, and the volume of the space in the fuel tank 1 when the remaining fuel amount is zero (or the fuel tank 1 is empty).

Figure 6:
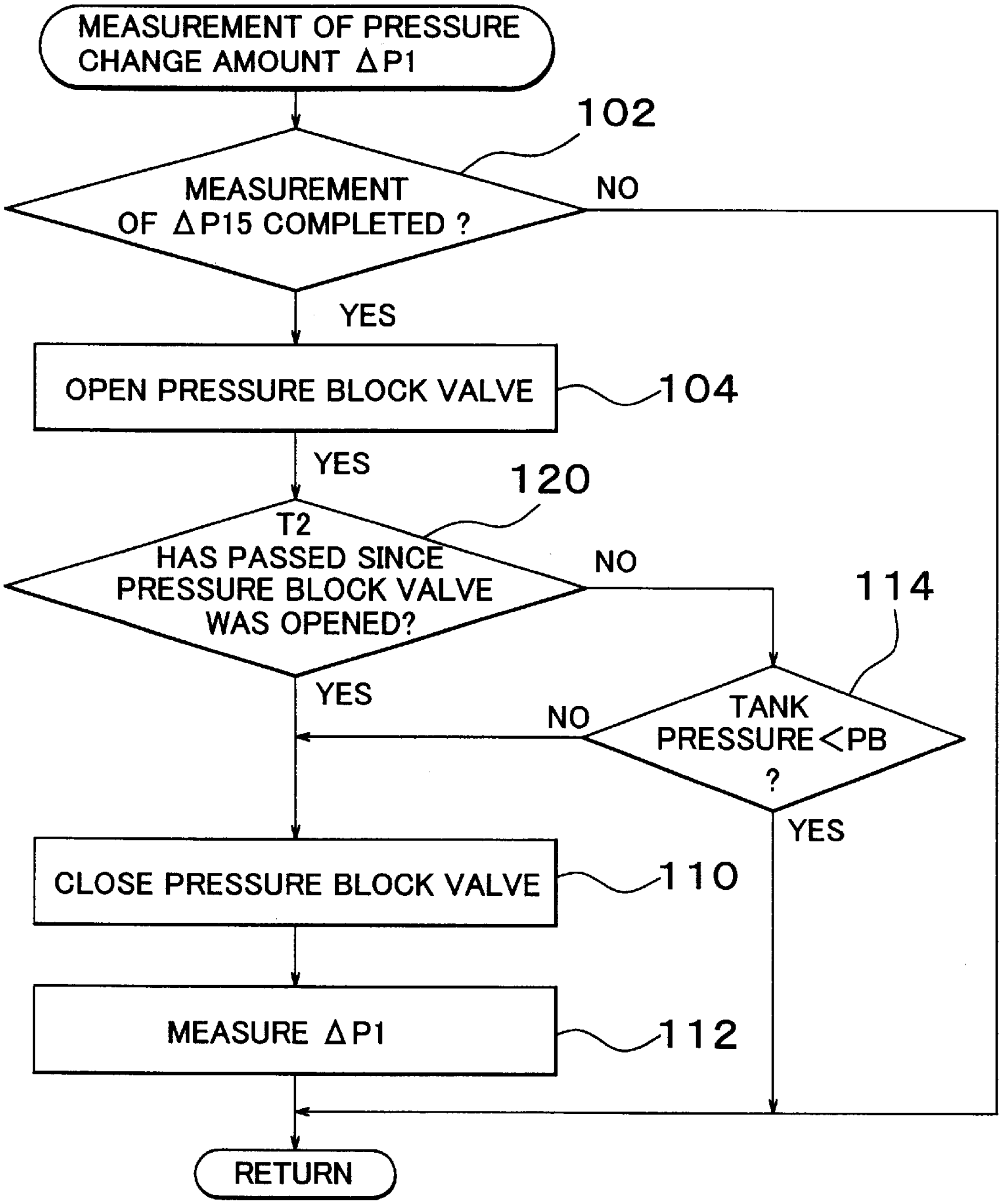
FIG. 6 is a flowchart showing a control routine of a measurement process according to the second embodiment of the invention.

Hereinafter, details of the diagnostic process will be described with reference to the flowchart of FIG. 6. The process of FIG. 6 is different from that of FIG. 5 in that steps 106 and 108 of FIG. 5 are omitted and step 120 is added. Since the process of FIG. 6 is otherwise identical with that of FIG. 5, detailed description thereof is omitted.

In step 102, the ECU 10 determines whether measurement of the pressure change rate ΔP15 has been completed. If an affirmative decision (YES) is obtained in step 102, the control flow goes to step 104 to open the pressure block valve 25*a*. Then, in step 120, the ECU 10 determines whether the predetermined time period T2 has passed or not since the pressure block valve 25*a* was opened.

If step 120 determines that the predetermined time period T2 has not passed since the pressure block valve 25*a* was opened, the control flow goes to step 114. If step 120 determines that the predetermined time period T2 has passed since the pressure block valve 25*a* was opened, the control flow goes to step 110. Then, in step 110, the ECU 10 operates to close the pressure block valve 25*a*, assuming that the tank pressure is certainly equal to or higher than the atmospheric pressure.

The present embodiment as described above yields the following effect or advantage.

(1) In the diagnostic apparatus of the present embodiment, the atmospheric pressure state as the basis for the measurement of the pressure change amount ΔP1 is determined when the predetermined time period T2 has passed since the pressure block valve 25*a* was opened after measurement of the pressure change rate ΔP15. Therefore, the purge path can be surely brought into the atmospheric pressure state irrespective of variations in the output error among individual pressure sensors 1*a*. Thus, the amount of fuel vapor generated in the fuel tank 1 can be measured with improved accuracy, thus assuring improved accuracy in the leak diagnosis.

Third Embodiment

Hereinafter, the third embodiment of the invention will be described mainly regarding differences from the first embodiment. Since a diagnostic apparatus according to the third embodiment is supposed to have the same structure as that of the first embodiment, the structure of the third embodiment will not be described herein.

Figure 8:
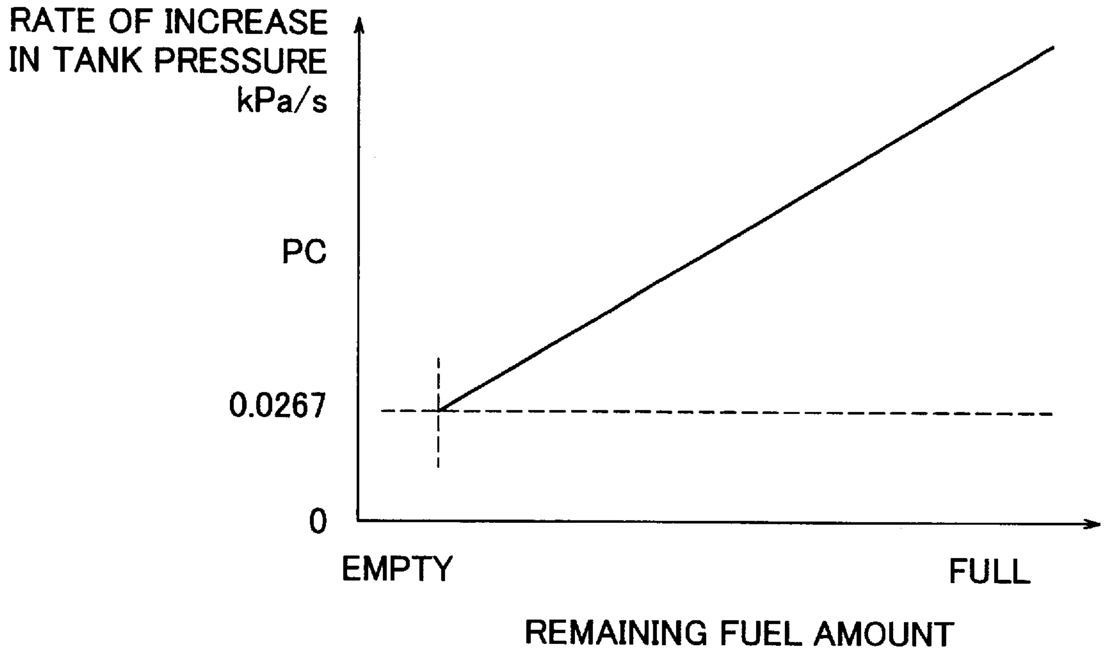
FIG. 8 is a graph showing the relationship between the remaining fuel amount and the tank pressure during introduction of the ambient air.

In the first embodiment, the purge path is determined as being in the atmospheric pressure state when the predetermined time period T1 has passed since the tank pressure measured by the pressure sensor 1*a* exceeded −PA after introducing the atmospheric pressure into the purge path. In the present embodiment, on the other hand, even before the predetermined time period T1 has passed since the tank pressure measured by the pressure sensor 1*a* exceeded −PA after introducing the atmospheric pressure into the purge path, the purge path is determined as being in the atmospheric pressure state if the rate of increase in the tank pressure is kept being less than a predetermined value PC (kPa/sec.) for a predetermined period of time. This is because, if the rate of increase in the tank pressure when the remaining fuel amount is zero (the fuel tank is empty) is PC upon introduction of the atmospheric pressure into the purge path, as shown in FIG. 4, the rate of increase in the tank pressure due to generation of fuel vapors in the tank is less than the predetermined value PC when the internal pressure of the purge path is actually kept equal to the atmospheric pressure. When the atmospheric pressure is applied to the purge path, the rate of increase in the tank pressure varies depending upon the remaining fuel amount, i.e., the volume of the space available in the fuel tank 1. For this reason, the predetermined value PC may vary depending upon a remaining fuel amount, as shown in FIG. 8.

Figure 7:
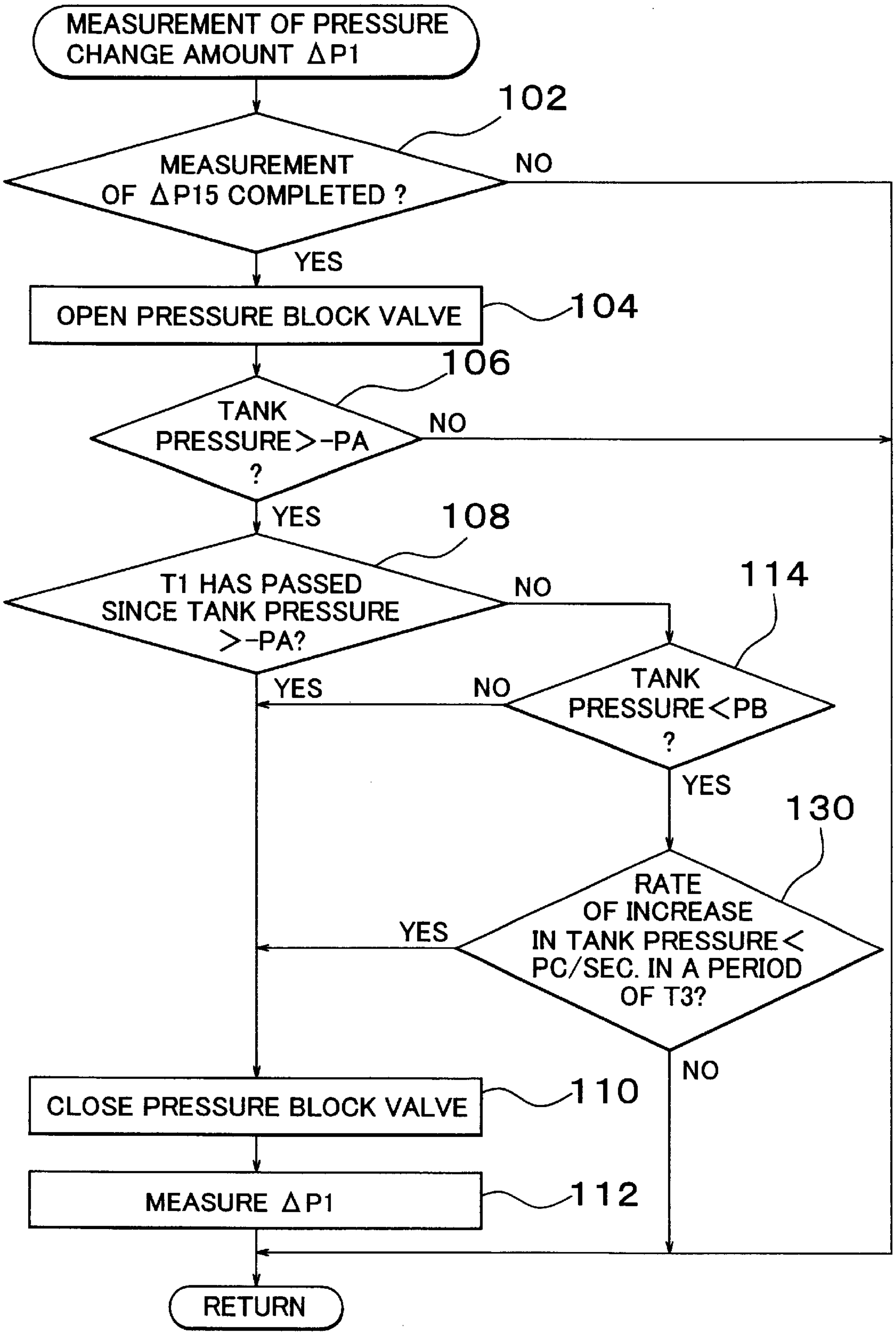
FIG. 7 is a flowchart showing a control routine of a measurement process according to the third embodiment of the invention.

Hereinafter, details of the diagnostic process will be described with reference to the flowchart as shown in FIG. 7. The process of FIG. 7 is different from that of FIG. 5 in that step 130 is added after step 114 of FIG. 5. Since the process of FIG. 7 is otherwise identical with that of FIG. 5, detailed description thereof is omitted.

In step 114, the ECU 10 determines whether the tank pressure is lower than PB or not. If step 114 determines that the tank pressure is lower than PB, the control flow goes to step 130. If step 114 determines that the tank pressure is equal to or higher than PB, the control flow goes to step 110.

In step 130, the ECU 10 determines whether the rate of increase in the tank pressure is less than the predetermined value PC (kPa/sec.) for a predetermined time period T3 or not. If a negative decision (NO) is obtained in step 130, the ECU 10 temporarily terminates the process. If an affirmative decision (YES) is obtained in step 130, the control flow goes to step 110.

In step 110, the ECU 10 operates to close the pressure block valve 25*a*, assuming that the tank pressure is certainly equal to or higher than the atmospheric 20 pressure.

Then, in step 112, the ECU 10 operates to measure the pressure change amount ΔP1 in 15 seconds after closing of the pressure block valve 25*a*. The ECU 10 performs leak diagnosis of the purge path based on the pressure change amount ΔP1 and the pressure change rate ΔP15.

The present embodiment as described above yields the following effect or advantage.

(1) In the diagnostic apparatus of the present embodiment, even before the predetermined time period T1 has passed since the tank pressure measured by the pressure sensor 1*a* exceeded −PA after introducing the atmospheric pressure into the purge path, the purge path is determined as being in the atmospheric pressure state if the rate of increase in the tank pressure is kept less than the predetermined value PC for the predetermined time period T3. In this manner, the purge path can be surely brought into the atmospheric pressure state irrespective of variations in the output error among the individual pressure sensors 1*a*. Therefore, the amount of fuel vapor generated in the fuel tank can be measured with improved accuracy, thus assuring improved accuracy in the leak diagnosis.

Fourth Embodiment

Hereinafter, the fourth embodiment of the invention will be described mainly regarding differences from the first embodiment. Since a diagnostic apparatus according to the fourth embodiment is supposed to have the same structure as that of the first embodiment, the structure of the fourth embodiment will not be described herein.

In the first embodiment, the purge path is determined as being in the atmospheric pressure state when the predetermined time period T1 has passed since the tank pressure measured by the pressure sensor 1*a* exceeded −PA after starting application of the atmospheric pressure to the purge path. In order to determine that the tank pressure has increased from −PA and reached the atmospheric pressure without fail, the predetermined time period T1 needs to be set to a large value.

In the present embodiment, on the other hand, the rate or speed at which the tank pressure returns to the atmospheric pressure (which will be simply referred to as eturn rate, i.e., the rate at which the tank pressure increases toward the atmospheric pressure, is calculated after the start of application of the atmospheric pressure to the purge path. The return rate thus calculated is then used for correcting a return determination time as a first predetermined period of time required for the tank pressure to return to the atmospheric pressure. When the return determination time elapses after a point of time when the tank pressure measured by the pressure sensor 1*a* exceeds −PA, the purge path is determined as being in the atmospheric pressure state. In the present embodiment, a period of return time required for the tank pressure to change over a predetermined pressure range is substituted for the return rate. During introduction of the atmospheric pressure into the purge path, the return time is influenced by the volume of space in the fuel tank, the size of a hole(s), if any, and the amount of fuel vapor generated in the fuel tank.

Where the atmospheric pressure is applied to the purge path after measurement of a change in the internal pressure with a negative pressure being applied to the purge path, as in the present embodiment, the return time becomes longer as the volume of space in the fuel tank is larger, the degree of hole opening (or the size of a hole) is smaller, or the amount of fuel vapor generated is smaller. On the contrary, the return time becomes shorter as the volume of space in the fuel tank is smaller, the degree of hole opening is larger, or the amount of fuel vapor generated is larger. Thus, the return determination time (as a criteria for determining the atmospheric pressure state of the purge path), which has been corrected based on the above-described return rate, involves influences of the volume of space in the fuel tank, the degree of hole opening, and the amount of fuel vapor generated. This makes it possible to more quickly determine that the purge path has been brought into the atmospheric pressure state.

The diagnostic process performed by ECU 10 for diagnosing a failure in the fuel vapor purge system will now be described.

Figure 9:
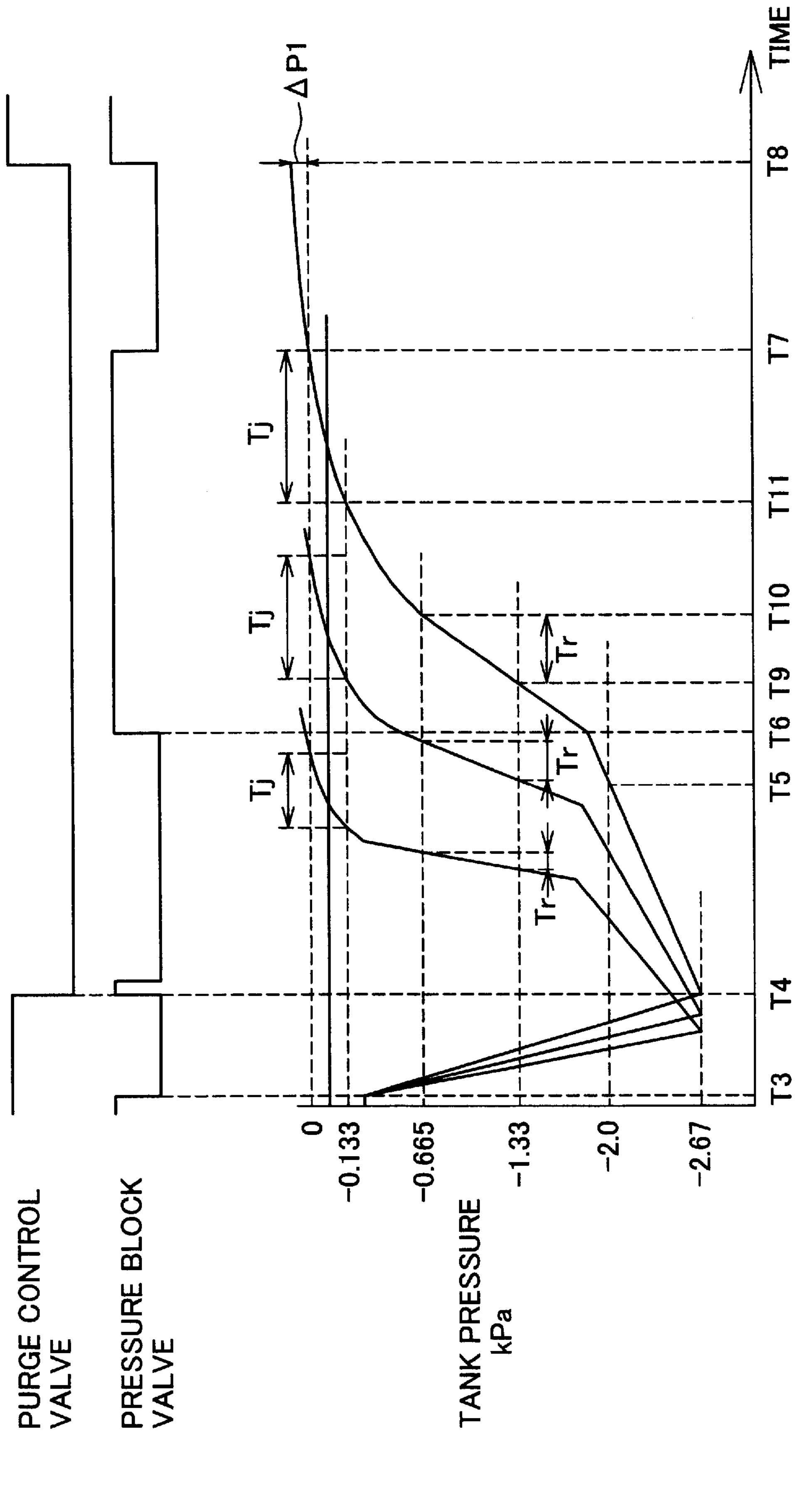
FIG. 9 is a timing chart showing one example of control operations performed by a diagnostic apparatus of the fourth embodiment.

The diagnostic process is roughly divided into the following processes: application of a negative pressure to the purge path and sealing thereof; measurement of the rate of change ΔP15 in the internal pressure of the fuel tank 1 after sealing; acquisition of the return time after the start of application of the atmospheric pressure to the purge path; measurement of the pressure change amount ΔP1 based on the amount of fuel vapor generated in the fuel tank 1, and leak diagnosis based on the pressure change amount ΔP1 and the pressure change rate ΔP15. In the following description, the respective processes and the operation of opening and closing the pressure block valve 25*a* during the processes will be briefly descried with reference to the timing chart of FIG. 9. In the example of FIG. 9, a pressure sensor that outputs the maximum value PB in a predetermined output error range of −PA (=−0.133 kPa) to +PB (=+0.133 kPa) in the atmospheric pressure state is used as the pressure sensor 1*a*.

Application of Negative Pressure to Purge Path and Sealing of Purge Path

Where the preconditions as described above with respect to the first mbodiment are established, the pressure block valve 25*a* is closed (timing T3 in FIG. 9). As a result, a negative pressure in the surge tank 9*a* is applied to the purge path through the purge passage 8, whereby the internal pressure of the fuel tank 1 is gradually reduced. If the internal pressure of the fuel tank 1 then reaches a predetermined value (e.g., 2.67 kPa =20 mmHg, the purge control valve 11 is closed (timing T4). As a result, application of a negative pressure to the purge path is discontinued, and at the same time the purge path is sealed. Also, when the negative pressure is applied to the purge path as described above, the pressure block valve 25*a* is temporarily opened only for a predetermine period after the internal pressure of the fuel tank 1 reaches the predetermined value as described above, in order to forcibly raise the internal pressure of the canister 2. As a result, an otherwise possible imbalance in the internal pressure between the canister 2 and the fuel tank 1 can be readily corrected or eliminated.

Measurement of Pressure Change Rate ΔP15

After a negative pressure is applied to the purge path and the purge path is sealed as described above, the pressure change rate ΔP15 is measured. For example, the amount of a pressure change within a predetermined time period (e.g., sec. (timing T5 to T6) is measured as the pressure change rate ΔP15. The predetermined time period starts when the internal pressure of the fuel tank 1 reaches a predetermined value (e.g., 2.0 kPa=15 mmHg (timing T5) that is higher than a pressure value at the time when the application of a negative pressure is finished. After the measurement of the pressure change rate ΔP15 is finished (timing T6), the pressure block valve 25*a* is again held in the open position.

Acquisition of Return Time

A period of time (from T9 to T10) that starts when the tank pressure reaches a predetermined value (e.g., 1.33 kPa=10 mmHg after the start of application of the atmospheric pressure to the purge path (timing T9) and ends when the tank pressure reaches another predetermined value (e.g., 0.665 kPa=5 mmHg (timing T10) is obtained as the return time Tr.

Measurement of Pressure Change Amount ΔP1

In measurement of the pressure change amount ΔP1, even after the start of the purge control, the purge control valve 11 as well as the pressure block valve 25*a* is forced to be closed when the purge path is brought into the atmospheric pressure state (timing T7). While the purge path is being sealed in this manner, the amount of change in the internal pressure of the fuel tank 1 in a predetermined period of time (e.g., 5 sec. is measured as the pressure change amount ΔP1.

In the diagnostic process of the present embodiment, the atmospheric pressure state serving as a basis for measurement of the pressure change amount ΔP1 is determined when the return determination time Tj that is proportional to the return time Tr elapses after a predetermined pressure −PA (=−0.133 kPa) is measured by the pressure sensor 1*a* (timing T11). While the pressure sensor 1*a* used in this embodiment outputs the maximum value PB in the atmospheric pressure state, the tank pressure can be surely increased to be equal to the atmospheric pressure if the return determination time Tj elapses after measurement of the minimum value −PA by the pressure sensor 1*a*. In the case where a pressure sensor 1*a* that outputs the minimum value −PA when the actual tank pressure is equal to the atmospheric pressure is used, the fuel tank is brought into the atmospheric pressure state without fail by the time when the sensor 1*a* outputs the minimum value −PA. Therefore, the output of the sensor 1*a* is maintained at −PA even after the return determination time Tj.

Leak Diagnosis based on Pressure Change Amount ΔP1 and Pressure Change Rate ΔP15

To determine the presence of a failure in the fuel vapor purge system, the pressure change rate ΔP15 is first compared with a predetermined normal-state determination value. If the pressure change rate ΔP15 is smaller than the normal-state determination value, it can be determined that no leakage through a hole occurs in the purge path. As a result, the system is diagnosed as being in a normal state.

If the pressure change rate ΔP15 is equal to or larger than the normal-state determination value, the pressure change rate ΔP15 is then compared with an abnormal-state determination value that is set to be larger than the normal-state determination value. If the pressure change rate ΔP15 is equal to or larger than the abnormal-state determination value, the pressure change amount ΔP1 is compared with a predetermined value (e.g., 0.267 kPa=mmHg. If the pressure change amount ΔP1 is equal to or smaller than the predetermined value, i.e., if the internal pressure of the fuel tank 1 has increased only by a small degree due to fuel vapor generated therein, it can be determined that the increase in the pressure change rate ΔP15 to the abnormal- state determination value or higher is caused by leakage of the purge path. In this case, the system is diagnosed as being in an abnormal state.

If the pressure change rate ΔP15 is equal to or greater than the abnormal-state determination value, but the pressure change amount ΔP1 is larger than the predetermined value, or if the pressure change rate ΔP15 is less than the abnormal-state determination value, it is difficult to accomplish highly accurate leak diagnosis, and therefore diagnosis or determination on the normal/abnormal state of the system is suspended.

A control routine for measuring the pressure change amount ΔP1 will now be described with reference to the flowchart shown in FIG. 10.

Figure 10:
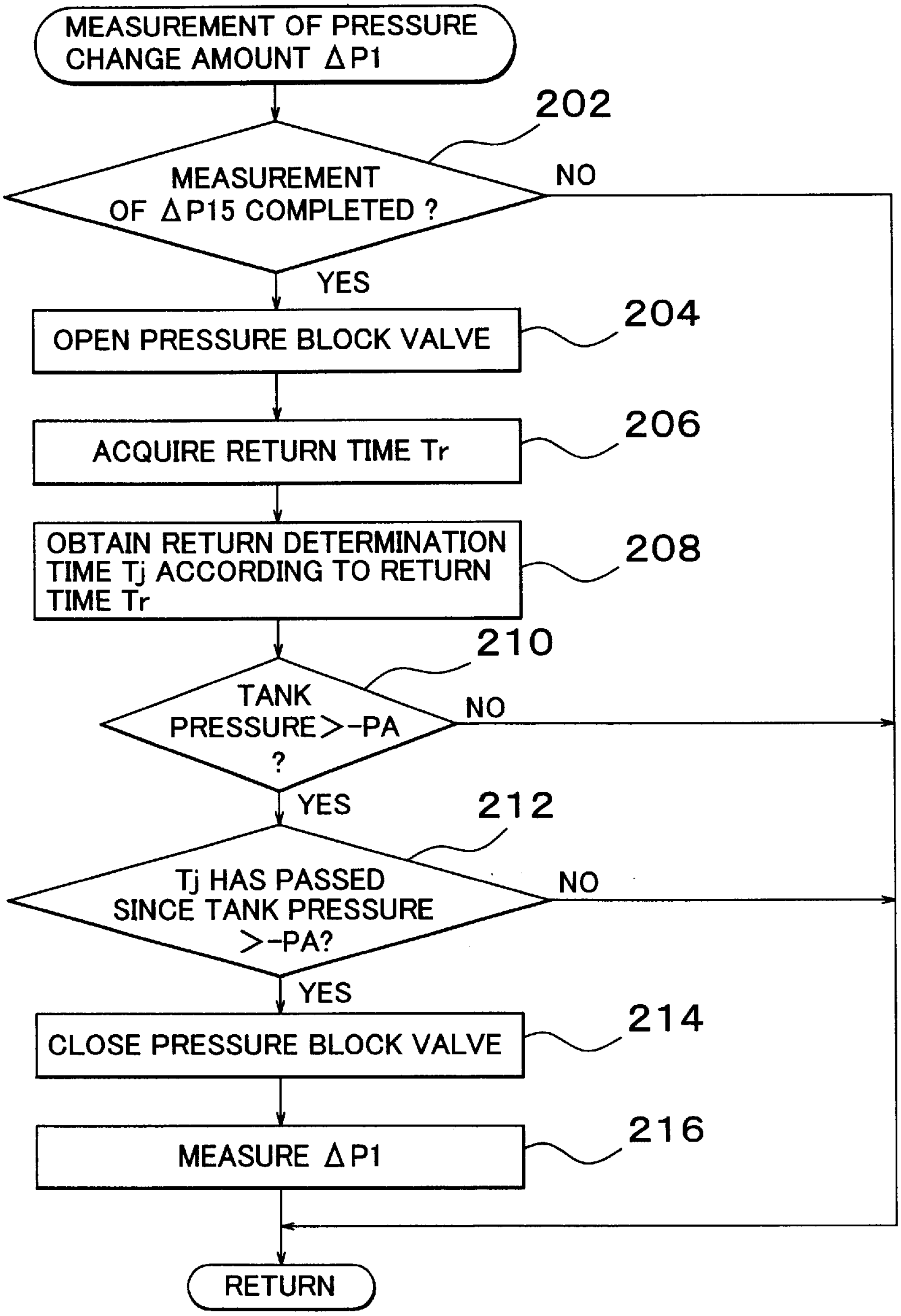
FIG. 10 is a flowchart showing a control routine of a measurement process according to the fourth embodiment.

A series of operations as indicated in the flowchart of FIG. 10 is performed by the ECU 10 as an interrupt routine to be executed at predetermined time intervals.

The ECU 10 initially executes step 202 to determine whether measurement of the pressure change rate ΔP15 has been completed or not. If it is determined that measurement of the pressure change rate ΔP15 has not been completed, the ECU 10 temporarily terminates the control routine.

If it is determined that measurement of the pressure change rate ΔP15 has been completed, the ECU 10 executes step 204 to open the pressure block valve 25*a* so as to introduce the atmospheric pressure into the purge path.

Figure 11:
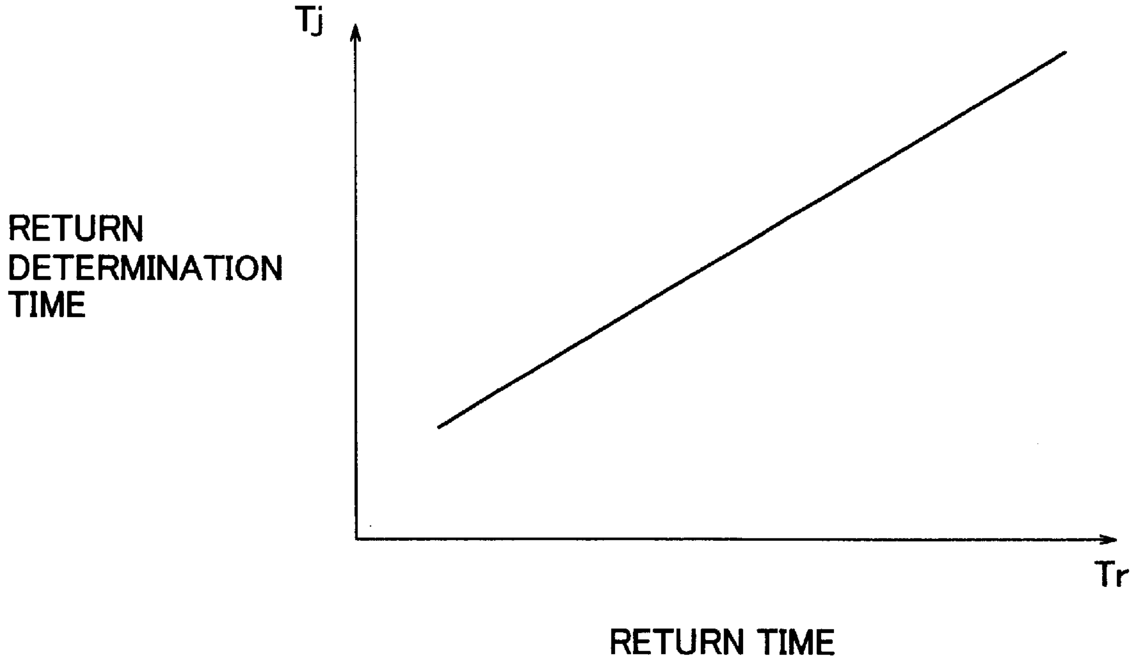
FIG. 11 is a map showing the relationship between the return time and the return determination time.

Subsequently, in step 206, the ECU 10 acquires the return time Tr. In the following step 208, the ECU 10 obtains the return determination time Tj that is proportional to the return time Tr, referring to the map shown in FIG. 11. Upon introducing the atmospheric pressure into the purge path, the rate at which the tank pressure returns to the atmospheric pressure varies depending upon the volume of space in the fuel tank, the size of a hole(s), if any, and the amount of fuel vapor generated. Therefore, as shown in FIG. 11, the return determination time Tj is set to a larger value as the return time Tr is increased.

Then, in step 210, the ECU 10 determines whether the tank pressure is higher than −PA (=−0.133 kPa) or not. If step 210 determines that the tank pressure is equal to or less than −PA, the ECU 10 temporarily terminates the control routine. If step 210 determines that the tank pressure is higher than −PA, the control flow goes to step 212.

In step 212, the ECU 10 determines whether or not the return determination time Tj has passed since the tank pressure exceeded −PA. If step 212 determines that the time Tj has not passed since the tank pressure exceeded −PA, the ECU 10 temporarily terminates the control routine. If it is determined that the time Tj has passed since the tank pressure exceeded −PA, the control flow proceeds to step 214.

In step 214, the ECU 10 operates to close the pressure block valve 25*a*, assuming that the tank pressure is certainly equal to or higher than the atmospheric pressure.

Then, in step 216, the ECU 10 measures the pressure change amount ΔP1 in 15 seconds after the pressure block valve 25*a* was closed. The ECU 10 performs leak diagnosis of the purge path based on this pressure change amount ΔP1 and pressure change rate ΔP15.

The present embodiment of the invention as described above yields the following effect or advantage.

(1) In the diagnostic apparatus of the present embodiment, the atmospheric pressure state, serving as a basis for the measurement of the pressure change amount ΔP1, is determined when the return determination time Tj proportional to the return time Tr elapses after the predetermined pressure −PA (=−0.133 kPa) is measured by the pressure sensor 1*a*. The return time Tr required for the tank pressure to return to the atmospheric pressure involves influences of the volume of space in the fuel tank 1, the degree of hole opening, and the amount of fuel vapor generated. Therefore, the return determination time Tj is also set, taking account of influences of the volume of space in the fuel tank 1, the degree of hole opening, and the amount of fuel vapor generated. By using the return determination time Tj, whether the purge path has been brought into the atmospheric pressure state or not can be more quickly determined with high reliability, and the amount of fuel vapor generated in the tank can be measured in an early time with high reliability.

It is to be understood that the invention is by no means limited to the illustrated embodiments, but may be embodied with various changes, modifications or improvements that would occur to those skilled in the art, so as to provide similar functions and effects.

(1) In the first to fourth embodiments, the fuel vapor purge system is of the type that the fuel tank 1 and the canister 2 always communicate with each other through the orifice 4*a*. However, the invention may be embodied as a fuel vapor purge system in which the canister is provided with a tank pressure control valve, which is adapted to shut off the canister from the fuel tank when the system is in a normal operating state.

(2) In any of the first to third embodiments, any of the predetermined time periods T1, T2 and T3, serving as a basis for detecting a certain state for determining that the purge path has reached the atmospheric pressure state, may be corrected based on the remaining fuel amount in the fuel tank 1. In this manner, the purge path can be brought into the atmospheric pressure state without fail. Consequently, the amount of fuel vapor generated in the fuel tank can be measured with high reliability and high accuracy, thus assuring improved accuracy in the leak diagnosis.

(3) In the fourth embodiment, the return time is substituted for the return rate. However, the return determination time may be corrected based on the return rate. Alternatively, the return determination time may be corrected based on the amount of pressure change within a predetermined period of time, which amount substitutes for the return rate.

(4) In the first to fourth embodiments, the invention is applied to diagnostic apparatuses for conducting leak diagnosis by introducing a negative pressure into the purge path is embodied. However, the invention may be applied to a diagnostic apparatus for conducting leak diagnosis by introducing a positive pressure into the purge path.

What is claimed is:

1. A diagnostic apparatus for a fuel vapor purge system wherein fuel vapor generated in a fuel tank is trapped in a canister, and the fuel vapor trapped in the canister is purged into an intake passage of an internal combustion engine through a purge path including the fuel tank, the apparatus comprising:

a pressure sensor that measures a pressure of a space in the fuel tank;

a diagnosing unit that conducts leak diagnosis of the purge path based on a change in the pressure in the fuel tank and an amount of fuel vapor generated in the fuel tank, said change in the pressure being measured after sealing the purge path while providing a difference between inside pressure and outside pressure of the purge path, said amount of fuel vapor being measured after applying an atmospheric pressure to the purge path and sealing the purge path; and a determining unit that determines that the purge path has reached an atmospheric pressure state upon detection of a predetermined state after starting application of the atmospheric pressure to the purge path, wherein said diagnosing unit measures the amount of fuel vapor generated in the fuel tank when said determining unit determines that the purge path has reached the atmospheric pressure state.

2. The diagnostic apparatus according to claim 1, wherein said predetermined state is a state in which a first predetermined period of time has passed after a predetermined pressure was detected by the pressure sensor.

3. The diagnostic apparatus according to claim 2, wherein the pressure sensor generates an output containing an error in an allowable output error range, and said predetermined pressure is substantially equal to the lowest pressure within an allowable pressure range detected as the atmospheric pressure by the pressure sensor, said allowable pressure range corresponding to said allowable output error range.

4. The diagnostic apparatus according to claim 2, wherein a criterion for detection of the predetermined state is corrected based on a remaining amount of fuel in the fuel tank.

5. The diagnostic apparatus. according to claim 2, wherein a criterion for detection of the predetermined state is corrected based on a rate at which the pressure in the tank returns to the atmospheric pressure after start of application of the atmospheric pressure to the purge path.

6. The diagnostic apparatus according to claim 1, wherein said predetermined state is a state in which a second predetermined period of time has passed after start of application of the atmospheric pressure to the purge path.

7. The diagnostic apparatus according to claim 6, wherein a criterion for detection of the predetermined state is corrected based on a remaining amount of fuel in the fuel tank.

8. The diagnostic apparatus according to claim 6, wherein a criterion for detection of the predetermined state is corrected based on a rate at which the pressure in the tank returns to the atmospheric pressure after start of application of the atmospheric pressure to the purge path.

9. The diagnostic apparatus according to claim 1, wherein the pressure sensor generates an output containing an error in an allowable output error range, and detects the highest pressure within an allowable pressure range as the atmospheric pressure, said allowable pressure range corresponding said allowable output error range, and wherein said predetermined state is a state in which the pressure sensor detects the atmospheric pressure as represented by the highest pressure.

10. The diagnostic apparatus according to claim 1, wherein said predetermined state is a state in which a rate of a change in the pressure in the fuel tank is smaller than a predetermined rate of pressure change during introduction of the atmospheric pressure into the fuel tank.

11. The diagnostic apparatus according to claim 10, wherein a criterion for detection of the predetermined state is corrected based on a remaining amount of fuel in the fuel tank.

12. The diagnostic apparatus according to claim 10, wherein a criterion for detection of the predetermined state is corrected based on a rate at which the pressure in the tank returns to the atmospheric pressure after start of application of the atmospheric pressure to the purge path.

13. The diagnostic apparatus according to claim 1, wherein said predetermined state is a state in which a rate of a change in the pressure in the fuel tank is kept smaller than a predetermined rate of pressure change during introduction of the atmospheric pressure into the fuel tank, for a third predetermined period of time.

14. The diagnostic apparatus according to claim 13, wherein a criterion for detection of the predetermined state is corrected based on a remaining amount of fuel in the fuel tank.

15. The diagnostic apparatus according to claim 13, wherein a criterion for detection of the predetermined state is corrected based on a rate at which the pressure in the tank returns to the atmospheric pressure after start of application of the atmospheric pressure to the purge path.

16. A method of diagnosing a fuel vapor purge system wherein fuel vapor generated a fuel tank is trapped in a canister and the fuel vapor trapped in the canister is purged into an intake passage of an internal combustion engine through a purge path including the fuel tank, the method comprising the steps of:

measuring a pressure of a space in the fuel tank;

measuring a change in the pressure in the fuel tank after sealing the purge path while providing a difference between inside pressure and outside pressure of the purge path;

measuring an amount of fuel vapor generated in the fuel tank after applying an atmospheric pressure to the purge path and sealing the purge path;

conducting leak diagnosis of the purge path based on the change in the pressure in the fuel tank and the amount of fuel vapor generated in the fuel tank; and detecting a predetermined state after starting application of the atmospheric pressure to the purge path, and determining that the purge path has reached an atmospheric pressure state upon detection of the predetermined state, wherein the amount of fuel vapor generated in the fuel tank is measured when it is determined that the purge path has reached the atmospheric pressure state.

17. The method according to claim 16, wherein said predetermined state is a state in which a first predetermined period of time has passed after a predetermined pressure was detected by the pressure sensor.

18. The method according to claim 17, wherein the pressure sensor generates an output containing an error in an allowable output error range, and said predetermined pressure is substantially equal to the lowest pressure within an allowable pressure range detected as the atmospheric pressure by the pressure sensor, said allowable pressure range corresponding to said allowable output error range.

19. The method according to claim 17, further comprising the step of correcting a criterion for detection of the predetermined state, based on a remaining amount of fuel in the fuel tank.

20. The method according to claim 17, further comprising the step of correcting a criterion for detection of the predetermined state, based on a rate at which the pressure in the tank returns to the atmospheric pressure after start of application of the atmospheric pressure to the purge path.

21. The method according to claim 16, wherein said predetermined state is a state in which a second predetermined period of time has passed after start of application of the atmospheric pressure to the purge path.

22. The method according to claim 21, further comprising the step of correcting a criterion for detection of the predetermined state, based on a remaining amount of fuel in the fuel tank.

23. The method according to claim 21, further comprising the step of correcting a criterion for detection of the predetermined state, based on a rate at which the pressure in the tank returns to the atmospheric pressure after start of application of the atmospheric pressure to the purge path.

24. The method according to claim 16, wherein the pressure. sensor generates an output containing an error in an allowable output error range, and detects the highest pressure within an allowable pressure range as the atmospheric pressure, said allowable pressure range corresponding said allowable output error range, and wherein said predetermined state is a state in which the pressure sensor detects the atmospheric pressure as represented by the highest pressure.

25. The method according to claim 16, wherein said predetermined state is a state in which a rate of a change in the pressure in the fuel tank is smaller than a predetermined rate of pressure change during introduction of the atmospheric pressure into the fuel tank.

26. The method according to claim 25, further comprising the step of correcting a criterion for detection of the predetermined state, based on a remaining amount of fuel in the fuel tank.

27. The method according to claim 25, further comprising the step of correcting a criterion for detection of the predetermined state, based on a rate at which the pressure in the tank returns to the atmospheric pressure after start of application of the atmospheric pressure to the purge path.

28. The method according to claim 16, wherein said predetermined state is a state in which a rate of a change in the. pressure in the fuel tank is kept smaller than a predetermined rate of pressure change during introduction of the atmospheric pressure into the fuel tank, for a third predetermined period of time.

29. The method according to claim 28, further comprising the step of correcting a criterion for detection of the predetermined state, based on a remaining amount of fuel in the fuel tank.

30. The method according to claim 28, further comprising the step of correcting a criterion for detection of the predetermined state, based on a rate at which the pressure in the tank returns to the atmospheric pressure after start of application of the atmospheric pressure to the purge path.

* * * * *